3,306,127
EXTENDIBLE STEERING CONTROL
Francis C. Rieger, Bronson, Mich., assignor to Kingston Products Corporation, Kokomo, Ind., a corporation of Indiana
Filed Jan. 4, 1965, Ser. No. 423,278
7 Claims. (Cl. 74—493)

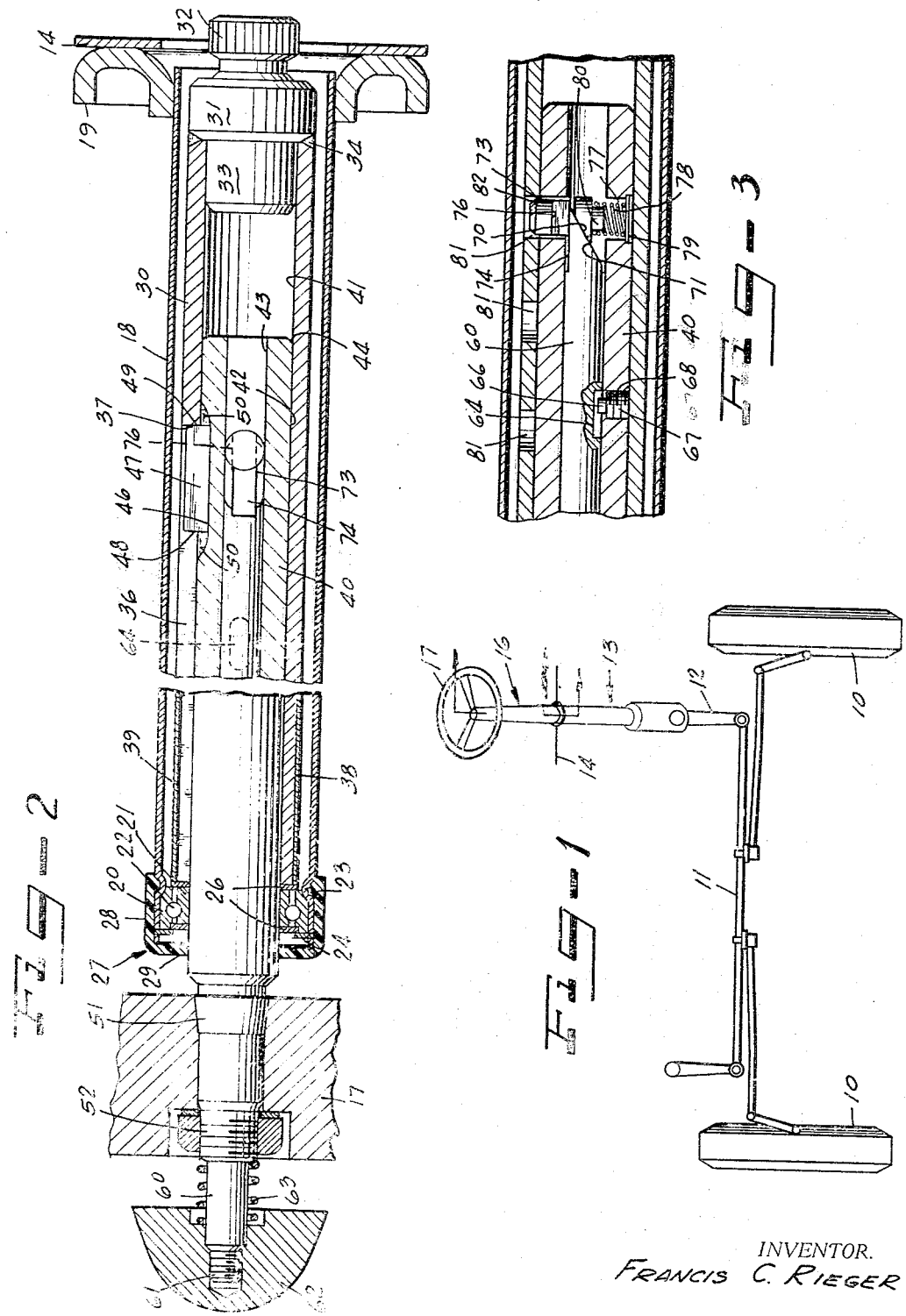

This invention relates generally to automotive steering columns for dirigible vehicles and more particularly relates to a steering column characterized by inner and outer telescoping tubular sleeve parts which may be selectively adjusted to provide a steering column of variable axial length.

In accordance with the principles of the present invention, there is provided an extendible steering column including inner and outer telescoping tubular sleeve parts each having a separate coupling portion for connecting one of the parts to a steering linkage at one end of the column and for connecting the other of the parts to an operator-manipulated steering wheel at the other end of the column. A drive connection is provided between the parts to insure co-rotatability of the parts while permitting longitudinal extension of the column by telescopic adjustment of the parts. Selectively operable latching means are also provided so that parts will normally be locked together and may be adjusted at the will of the operator.

It is an object of the present invention, therefore, to provide an extendible steering column for a dirigible vehicle.

Yet another object of the present invention is to provide an improved steering column construction wherein the axial length of the column may be selectively adjusted by the operator in order to position the steering wheel at different locations corresponding to the needs of the operator.

Yet another object of the present invention is to provide an extendible steering column which is made of parts which are economical to produce and reliable in operation.

Many other advantages, features and objects of the present invention will become manifest to those versed in the art upon making reference to the detailed description and the accompanying sheet of drawings in which a preferred embodiment of an extendible steering column embodying the features of the present invention is shown by way of illustrative example.

On the drawings:

FIGURE 1 is a somewhat diagrammatic view of a steering assembly for a dirigible vehicle showing an extendible steering column in accordance with the principles of the present invention associated therewith;

FIGURE 2 is a cross-sectional view of the extendible steering column taken generally on line II—II of FIGURE 1; and FIGURE 3 is a fragmentary cross-sectional view similar to FIGURE 2 but turned through 90° to show additional details of construction of the lock pin and actuating mechanism.

As shown on the drawings:

FIGURE 1 illustrates somewhat diagrammatically the steering assembly of a dirigible vehicle such as an automobile or a truck. Thus, there is provided a pair of wheels 10, 10 and a steering linkage is shown generally at 11 which is actuated by a pitman arm 12 driven through a steering column shown generally at 13 and which may include power-assisting means as an integral part of the column.

The cowling of the vehicle is shown generally at 14 and the extendible column of the present invention is shown at 16 with a conventional ring-type steering wheel 17 at the end thereof.

Turning now to FIGURES 2 and 3 in conjunction with FIGURE 1, the details of construction of the extendible column 16 may be described. Affixed to the cowling 14 is a generally tubular housing 18 having a radially outwardly extending flange 19 at one end thereof. At the other end of the housing 18 there is provided a bearing assembly including an outer race ring 20, an inner race ring 21 and a plurality of shiftable bearing elements such as balls 22.

The outer race ring 20 is retained in assembly with the housing 18 by means of a suitable embossment 23 formed in the walls of the housing 18 and by a retainer ring 24 abutting the other end of the outer race ring 20. Retainer rings shown at 26 are also provided at opposite ends of the inner race ring and a cap member, shown generally at 27, is provided including an axially extending leg 28 which snugly engages the outer peripheral surface of the end of the housing 18 and a radially inwardly extending leg 29 which forms a dust seal and shaft wiper to aid in keeping foreign matter from entering into the steering control assembly.

Situated within the housing 18 is an inner tube assembly comprising a generally tubular sleeve 30 having a coupling member shown generally at 31 for driving attachment to the steering linkage 11 via the column 13 at one end of the housing 18. More particularly, the coupling member 31 has a splined coupling hub 32 as well as a pilot portion 33 which is inserted into the end of the sleeve 30 and affixed in firm assembly therewith by means of a weldment 34.

The sleeve 30 is particularly characterized by a longitudinally extending slot 36 which terminates at a radial shoulder 37 and extends to the other end of the sleeve 30. Adjacent the end of the sleeve 30 there is provided a peripheral recess 38 in which is received a circumferentially continuous retaining band 39 which is used to prevent distortion of the inner tube assembly including the sleeve 30.

A generally tubular shaft 40 is inserted into the tubular sleeve 30 and is slidably positionable into and out of the tubular sleeve 30 through the cap member 27 to vary the effective axial length of the shaft 40 and the sleeve 30. In this connection, it will be noted the sleeve 30 is formed with a bore 41 providing a bore wall for receiving the external peripheral surface 42 of the shaft 40. The shaft 40, in turn, is provided with an internal bore 43. The end wall of the shaft 40 is chamfered as at 44, thereby to reduce possible interference in axial movement of the shaft 40 within the bore 41. Formed in the peripheral surface of the shaft 40 is a slot which may be milled out or otherwise formed and which slot is indicated at 46. A driving key or pin taking the form of a rectangular lug 47 is positioned in the slot 46 and extends radially outwardly thereof, thereby to provide spaced abutment shoulders at 48 and 49, respectively. The lug or key or pin 47 is retained in firm assembly with the shaft 40 by means of weldments 50, 50 at opposite ends thereof. Thus, the shoulder 49 will engage the shoulder 37 and the shoulder 48 is engageable with the end of the retaining band 39, thereby permitting the retaining band to develop a stop function which determines the upper limit of travel of the shaft 40 within the bore 41.

The shaft 40 has a reduced section outwardly of the dust cap 27 including a tapered portion 51 for bottoming the hub of the steering wheel 17, as well as a threaded portion 52 which permits the steering wheel 17 to be locked in co-rotatable assembly with the shaft 40.

In order to lock the shaft 40 and the sleeve 30 in selected axial positions, actuating means and pin and recess lock means are provided. First of all, there is provided an actuating rod 60 which is inserted into the bore 43 of the shaft 40. At one end of the actuating rod 60 there is provided a threaded portion 61 to facilitate attachment thereto of an actuating knob 62. A continuous biasing means such as coil spring 63 is interposed between the knob 62 and the steering wheel 17, thereby to bias the actuating rod 60 in one direction.

In order to determine the length of travel of the actuating rod 60 within the bore 43, the peripheral surface of the actuating rod is formed with an oval recess 64 in which is received an abutment end 66 of a dog pin screw 67 fastened in a threaded opening 68 formed in the wall of the shaft 40.

The free end of the actuating rod 60 is characterized by the formation thereon of an angularly inclined ramp 70 forming an action surface for slidingly engaging a correspondingly angularly inclined ramp 71 provided on a lock pin 73. The side of the actuating rod 60 opposite the inclined ramp 71 is formed with a generally rectangular recess 74 providing additional clearance for facilitating actuation of the lock pin 73. It will be noted that the lock pin has a recess 76 formed therein, and the shaft 40 has a through opening 77 which receives the lock pin 73 as well as a coil spring 78 therein. The spring 78 and the lock pin 73 are retained within the opening 77 by a plate 79. The lock pin has a pilot portion 80 which pilots into the coils of the spring 78 and thus the lock pin 73 is normally biased towards locking relation with one of a plurality of longitudinally spaced openings shown at 81 and disposed in a longitudinal row in the sleeve 30. The end of the lock pin 73 has a chamfered finding portion 82 to facilitate entry of the lock pin 73 into the respective holes 81.

In operation, therefore, the actuating rod 60 is pushed inwardly by the operator by engaging the knob 62 and moving the rod 60 against the bias of the spring 63. The ramp 70 then engages the ramp 71 and moves the lock pin 73 in a radial direction to disengage the pin from a corresponding hole 81. The shaft 40 can then be selectively adjusted by locating the pin 73 in a different one of the holes 81.

Since the key 47 is slidably disposed within the slot 36, the shaft 40 and the sleeve are always locked in co-rotatable assembly but axial adjustment is readily accommodated.

Although minor modifications might be suggested by those versed in the art, it should be understood that I wish to embody within the scope of the patent warranted hereon all such modifications as reasonably and properly come within the scope of my contribution to the art.

I claim as my invention:

1. An extendible steering column comprising
   inner and outer telescoping tubular sleeve parts
      each having a separate coupling portion for connecting one of said parts to a steering linkage at one end of said column and for connecting the other of said parts to an operator-manipulated steering wheel at the other end of the column,
   a key and slot driving connection between said parts insuring co-rotatability of said parts while permitting longitudinal extension of said column by telescopic adjustment of said parts,
   and latching means between said parts comprising spring-biased pin and recess means between said parts and an actuator rod slidably concentrically disposed in said inner sleeve part, said actuator rod having an action portion for selectively disengaging said pin and recess means and having a portion extending axially outwardly of said other end of said column into an accessible region near the steering wheel for manipulation by an operator.

2. An extendible steering column comprising
   a generally tubular housing having a radially outwardly extending flange at one end,
   a cap forming a dust seal and shaft wiper at the other end of said housing,
   an inner tube assembly comprising a generally tubular sleeve having a coupling member for driving attachment to a steering linkage at said one end of said housing radially inwardly of said flange,
   a tubular shaft inserted into said tubular sleeve and slidably positionable into and out of said tubular sleeve through said cap member to vary the effective axial length of said shaft and said sleeve,
   bearing means between said housing and said shaft inwardly of said dust cap and affording rotatability of said shaft relative to said housing,
   and an actuating rod slidably inserted into said shaft and having an inclined ramp at the innermost end thereof,
   pin and recess means between said sleeve and said shaft locking said sleeve and said shaft in selected axial adjustment and including a lock pin having an inclined ramp engageable with said ramp on said actuating rod,
thereby to selectively move said locking pin out of locking position when said actuating rod is operated,
   and a driving key connected in form assembly to said shaft,
      said sleeve having a longitudinally extending slot receiving said driving key for locking said sleeve and said shaft together for corotation while accommodating relative axial adjustment therebetween.

3. An extendible steering column as defined in claim 2,
   said pin and recess means comprising a plurality of openings spaced longitudinally in a row along the length of said sleeve,
   and said lock pin including a spring-biased pin member disposed generally diametrically with respect to said shaft and normally biased into one of said openings.

4. An extendible steering column as defined in claim 2,
   said actuating rod having a peripheral slot and said shaft carrying a pin having a lug traveling in said peripheral slot,
thereby to limit the axial movement of said actuating rod in said steering column.

5. An extendible steering column as defined in claim 4,
and further characterized by
   an actuating knob on the end of said actuating rod,
   a steering wheel on said shaft,
   and a spring operatively biasing said actuating rod in one direction,
whereby said knob can be engaged to move said actuating rod against said spring bias to selectively adjust the length of the steering column.

6. An extendible steering column as defined in claim 2,
   said actuating rod being cylindrical in configuration,
      the end of said actuating rod being truncated to form said angularly inclined ramp surface on one side of said rod,
      and a recess on the opposite side of said rod forming a flat rectangular clearance surface to facilitate cooperation with said lock pin.

7. An extendible steering control comprising
   a first shaft member for connection to a steering linkage of a dirigible vehicle
      and having a hollow bore formed therein
      and an elongated slot extending longitudinally in the wall thereof,
   a second shaft member telescopically received in said hollow bore of said first shaft member
      and having a driving key projecting radially therefrom for rotatably drivingly engaging said first shaft member in axially adjustable positions in said slot, an actuator rod received in said second shaft member,
pin and recess means between said first and second shaft members and actuated by said actuator rod to afford selective variation in the length of the steering column
and means for operating said actuator rod,
thereby to selectively vary the length of the steering control.

References Cited by the Examiner
UNITED STATES PATENTS

| | | | |
|---|---|---|---|
| 2,075,110 | 3/1937 | Garretson | 74—493 |
| 2,516,382 | 7/1950 | Hazel | 287—58 X |
| 3,058,367 | 10/1962 | Hoffmann | 74—493 |
| 3,103,375 | 9/1963 | McMullen | 287—58 |

MILTON KAUFMAN, *Primary Examiner.*